(12) United States Patent
Braasch et al.

(10) Patent No.: US 6,351,313 B1
(45) Date of Patent: Feb. 26, 2002

(54) DEVICE FOR DETECTING THE POSITION OF TWO BODIES

(75) Inventors: Jan Braasch, Trostberg; Christian Callimici, Miesbach, both of (DE); Sascha Weikert, Forch (CH)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/679,708

(22) Filed: Oct. 5, 2000

Related U.S. Application Data

(63) Continuation of application No. 09/508,780, filed as application No. PCT/IB98/01476 on Sep. 24, 1998, now abandoned.

(51) Int. Cl.⁷ ............................................... G01B 11/00
(52) U.S. Cl. ........................ 356/616; 356/150; 33/707
(58) Field of Search ................... 356/150, 615, 356/616, 618, 619; 33/1 M, 707; 250/559.29

(56) References Cited

U.S. PATENT DOCUMENTS 3,184,600 A * 5/1965 Potter ........................ 356/618

FOREIGN PATENT DOCUMENTS

| GB | 2 034 880 | 6/1980 |
|---|---|---|
| JP | 08 241850 | 9/1996 |

* cited by examiner

*Primary Examiner*—Richard A. Rosenberger
(74) *Attorney, Agent, or Firm*—Kenyon & Kenyon

(57) ABSTRACT

A device for detecting six components of the relative motion of two bodies during a primarily two-dimensional translatory basic motion is described. The device has a plate which is provided with a two-dimensional, optical grating, and which is equipped with a plurality of vertically arranged devices for distance measuring. A second element which is composed of an arrangement of two or three optical gratings, and a plane surface which is parallel to the gratings is included. The optical gratings permit a detection of the relative displacements in X- and Y- directions parallel to the lower plate via an evaluation of the variations in intensity of the reflected light.

11 Claims, 5 Drawing Sheets

DEVICE FOR DETECTING THE POSITION OF TWO BODIES

This application is a continuation of Ser. No. 09/508,780, abandoned, which is a 371 PCT/IB98/01476, filed Sep. 24, 1998.

BACKGROUND INFORMATION

The present invention relates to a device for detecting and/or adjusting the position of two bodies capable of being moved relative to each other, the bodies having cross gratings. The invention is thus a measuring device allowing the detection of the six possible motion components taking place during a primarily plane, two-dimensional translatory relative motion of two bodies.

SUMMARY OF RELATED ART

In known position measuring devices, it is generally not possible to detect all six possible motion components. In addition, reference bodies used as measurement standards, having two or three plane reference surfaces precisely arranged relative to each other, are required to perform the measurement.

The known devices are not only restricted with regard to the detection of motion components, but moreover have an extraordinary degree of structural complexity. Generally, they are based on the use of a linear measurement standard.

SUMMARY OF THE INVENTION

The object of the present invention is to provide a device which, using a simple design, allows to detect all six motion components.

In one aspect, the invention is a device for detecting and adjusting a position of two bodies movable relative to each other, comprising a plane areal measurement standard disposed on a first of the bodies as a plane reference surface, comprising a two-dimensional grating division, a plane surface disposed on a second of the bodies, the plane surface being parallel to the measurement standard and having at least two gratings arranged on the plane surface forming a scanning head and at least one distance measuring device disposed between the first and second bodies.

In another aspect, the invention is a device for positioning a wafer carrier body of a wafer stepper machine, comprising a plane areal measurement standard disposed on a base portion of the machine as a plane reference surface, comprising a two-dimensional grating division, a plane surface disposed on a carrier body, the plane surface being parallel to the measurement standard and having at least two gratings arranged on the plane surface forming a scanning head, and at least one distance measuring device disposed between the base portion and the carrier body. The device also includes contact free bearings and actuators provided on the component carrier body, and a controller for receiving position data from the scanning head and the at least one distance measuring device, wherein the orientation of the component carrier body relative to the two-dimensional grating division is adjustable by controlling the bearings and actuators with the controller, in response to the position data.

According to the present invention, relative translations and a rotations can be detected by optical means and, at the same time, the distances at three locations between two surfaces of the bodies can be detected, so that all six components of the relative motion of the bodies are detected.

With the known technology, it was necessary to manufacture measurement standards, such as reference bodies, having two to three plane reference surfaces precisely arranged relative to each other. According to the invention, it is only required to make one surface, which constitutes a considerably lower production effort. Compared to this, the use of cuboidal measuring standards having two or more reference surfaces requires a considerably greater technical effort in carrying out measurements.

According to the present invention, an exact spatial alignment of the components is not required, and the parallelism of the measuring system components relative to two planes does not have to be guaranteed to carry out the measurement. In the present invention, two bodies are to be arranged roughly parallel to each other relative to only one plane, which is additionally facilitated by the distance-measuring devices resulting in three identical distances that equal to both planes being parallel. A jointing operation, as was required in previous cases, is not required, thus making it considerably easier for measurements to be carried out.

Using incremental position-measuring systems having grating divisions for position and situation measuring results in a high accuracy, high resolution measurement, low susceptibility to failure (electromagnetic), stability with regard to atmospheric influences such as air temperature, humidity, and pressure that can have a disruptive effect when using laser interferometers.

BRIEF DESCRIPTION OF THE DRAWINGS

The present invention is explained in more detail with reference to the following drawings. In the Drawings.

DETAILED DESCRIPTION OF THE EMBODIMENTS OF THE INVENTION

Figure 1:
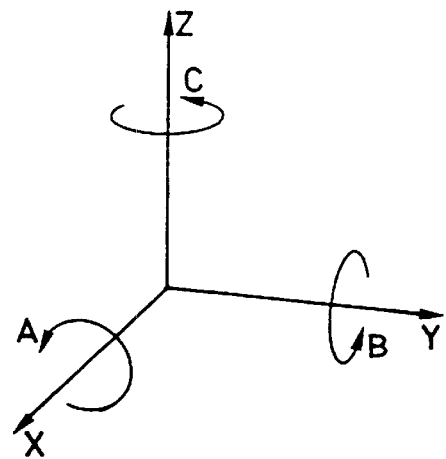
FIG. 1 shows schematically the coordinate system describing motions of a body having six degrees of freedom.

A typical rigid body has six degrees of freedom: three translational motion components in the X, Y and Z axes, and three rotational degrees of freedom A, B and C. The position and orientation of a body are completely described by specifying the six degrees of freedom. By specifying the time characteristic of these six quantities, the motion of the body is defined completely. The arrangement of these degrees of freedom is shown in FIG. 1 on the basis of a coordinate system standardized according to ISO.

The detection of the relative position of a tool and a workpiece on machine tools or other automatic handling systems constitutes a central object of the metrology of a machine. A series of measuring instruments have been developed for this purpose. It is a characteristic of conventional devices that only sub-components of the relative motions can be detected. Generally it is not possible to detect all six degrees of freedom which describe the relative motion completely.

Consequently, the static and dynamic accuracy of machine tools and automatic handling systems is limited by separately detecting individual geometric characteristics using a plurality of measuring instruments. Using the various measuring means requires a considerable technical effort and outlay of time. In addition, between the different measurements, changes occur in the system to be examined, which could not be taken into account until now.

Conventional devices allowing the detection of all six motion components have a linear preferential direction. Therefore, these measuring devices only allow limited detection of the motion components in the non-preferential direction, that in the following description is referred to as the X-direction. Consequently, it is not possible to detect motions having more than one defined motion coordinate with conventional devices.

The present invention allows the detection of all motion components during primarily two-dimensional motions. Consequently, the coherent detection of all motion components in the case of normal plane paths is possible. Coherence of measurements is required to rule out changes in the system to be examined while the measurement is being carried out.

The possibility of performing coherent measurements permits considerable time and cost savings compared to previous procedures. Until now, the only way to detect the entire machine behavior, at least to some extent, was to carry out machining tests. The relative motion of the tool and the workpiece can be detected indirectly, leaving the rotary motion of the rotating tool out of consideration, but the obtained results are affected by the influences superimposed by the process. It is then necessary to derive geometric data from the shape of the workpiece, with the assistance of measuring techniques. In checks of this kind, however, the time characteristic of the deviation quantities cannot be ascertained.

Figure 2:
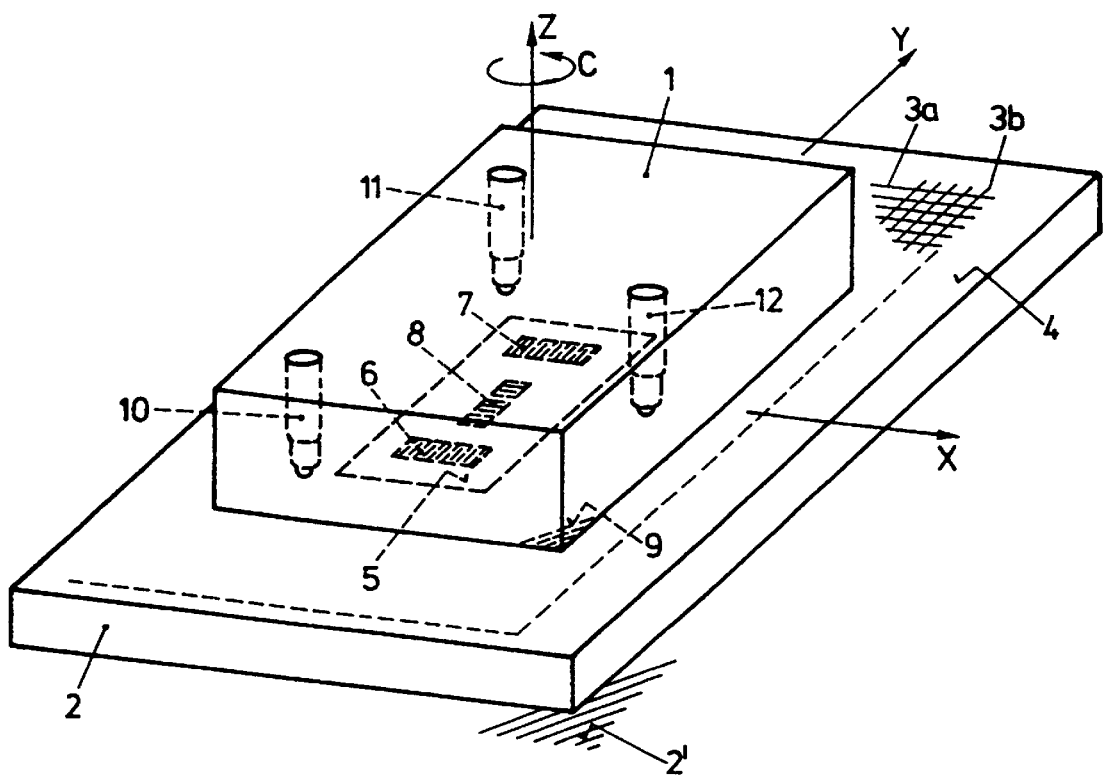
FIG. 2 shows a schematic drawing of the measuring system according to the present invention.

As FIG. 2 shows, a body 1 is fixedly joined to a base, such as a tool holder, that is not shown. A body 2 is rigidly joined to a base plate 2' that can be a workpiece support, whose motion relative to the mentioned base is to be detected. If body 1 is now moved approximately in the X-Y plane, all motion components of the relative motion can be detected.

The device is composed of two bodies 1, 2. Body 2 carries an arrangement of two orthogonal gratings 3a, 3b in a plane 4. Body 1 is provided with a plane arrangement 5 of gratings 6, 7, and 8 as well. Two of these gratings in plane 9, are parallel, namely 6 and 7, and the third, 8, is arranged perpendicularly to these first gratings.

This arrangement of gratings 3a, 3b, and 6 through 8 allows the detection of the translational relative motion of bodies 1, 2 in the X- and Y-directions, and, at the same time, the detection of the rotational relative motion (C) of the two bodies, by comparing the detected positions of the two parallel gratings 6 and 7. If, in addition, devices for detecting the distances of the bodies are also provided between the two bodies 1 and 2, then, concurrently with the two translatory and the one rotatory degrees of freedom, a further translatory and two further rotatory degrees of freedom can be detected.

For example, between the two bodies 1, 2 three devices 10, 11, 12 for distance measuring are mounted in a way that the distances between the two bodies 1, 2 or between the two planes 4 and 9 can be detected. The arrangement of the distance-measuring devices, that for example can determine a distance by a capacitive, inductive, haptic, or dynamic pressure measurement, can be selected freely. The measuring points for detecting the distances, however, must not be situated on a straight line for geometrical reasons. The evaluation of the three distances provides information on the translatory degree of freedom dZ and the rotatory degrees of freedom dA and dB. If less than three distance-measuring points are used, then correspondingly fewer motion components can be detected. For example, with:

3 probes: dZ, dA, dB become explicitly determinable;
2 probes: dZ is determinable explicitly, dA, dB only in their total;
1 probe: dZ is determinable explicitly, however, with limitations, dA and dB cannot be determined.

The scope of the results when using less than 3 gratings on body 1 is similar: with 3 gratings, 2 of which are of orthogonal, the third parallel to one of the two first gratings, detection is possible of the two relative translations and the relative rotation about axes which stand perpendicularly to these translations.

With 2 gratings, that are orthogonal, the two-dimensional, translatory motion is detected, but no results are possible regarding the rotation about the axis perpendicular to the two translatory motions.

With 1 grating, only the motion transverse to the relevant line graduation can be detected.

Figure 3A:
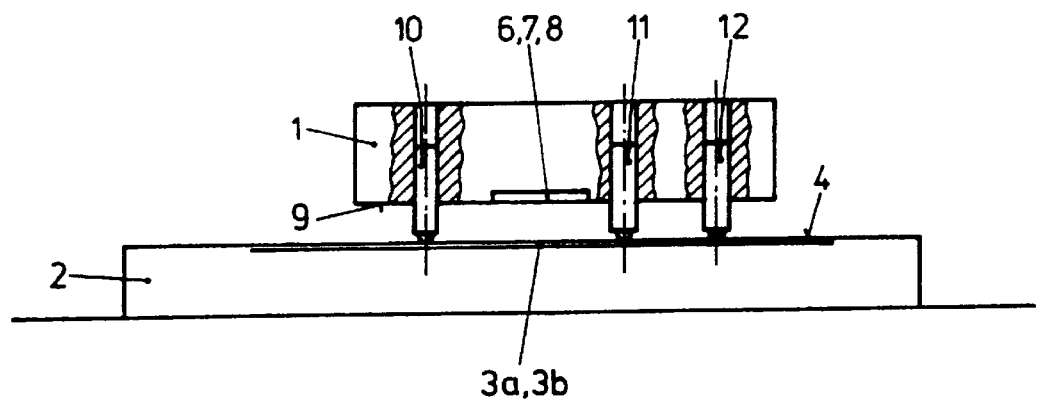
FIGS. 3a through 3c show schematics of three embodiments according to the invention of the measuring system.

FIG. 3a shows a grating division 3a, 3b and distance reference surface disposed on the same body. The areal grating division 3a is attached to body 2, the three gratings 6, 7 and 8 to body 1. The distance-measuring devices 10, 11, 12 are attached to body 1 and detect three distances to reference surface 4 on body 2.

Figure 3B:
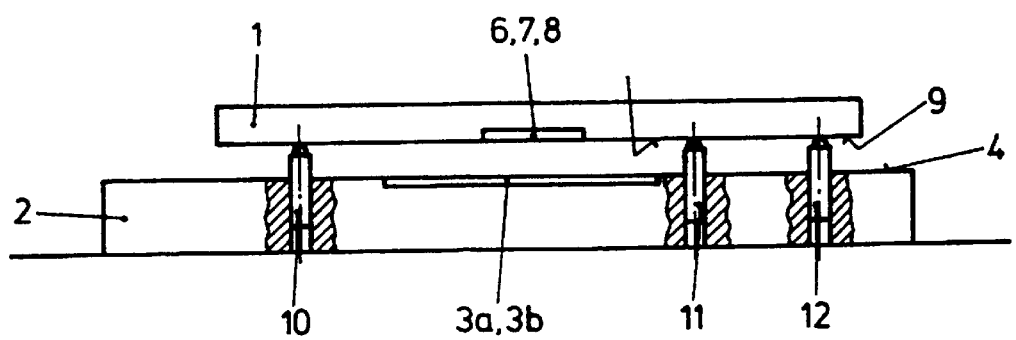

FIG. 3b shows areal grating divisions 3a, 3b on body 1, and a distance reference surface on the other body 2. The areal grating divisions 3a, 3b are attached to body 2, and the three gratings 6, 7, and 8 to body 1. The distance-measuring probes 10, 11, 12 are attached to body 2 and detect three distances to reference surface 9 on body 1.

Figure 3C:
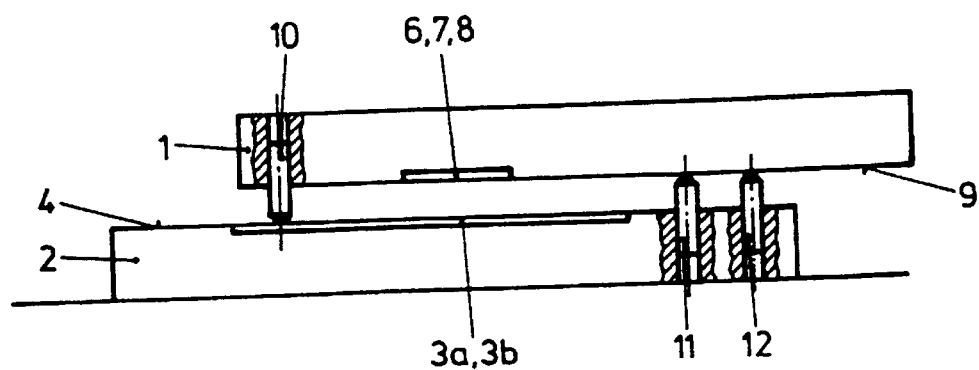

FIG. 3c shows areal grating divisions 3a, 3b on body 1 and distance reference surfaces on both bodies. The areal grating division 3a, 3b are attached to body 2, and the three gratings 6, 7, and 8 to body 1. The distance-measuring devices are divided in this case, so that device 10 is attached to body 1, and devices 11 and 12 to body 2. The devices respectively detect the distance to reference surface 4 on body 2, and the distances to reference surface 9 on body 1.

Figure 4:
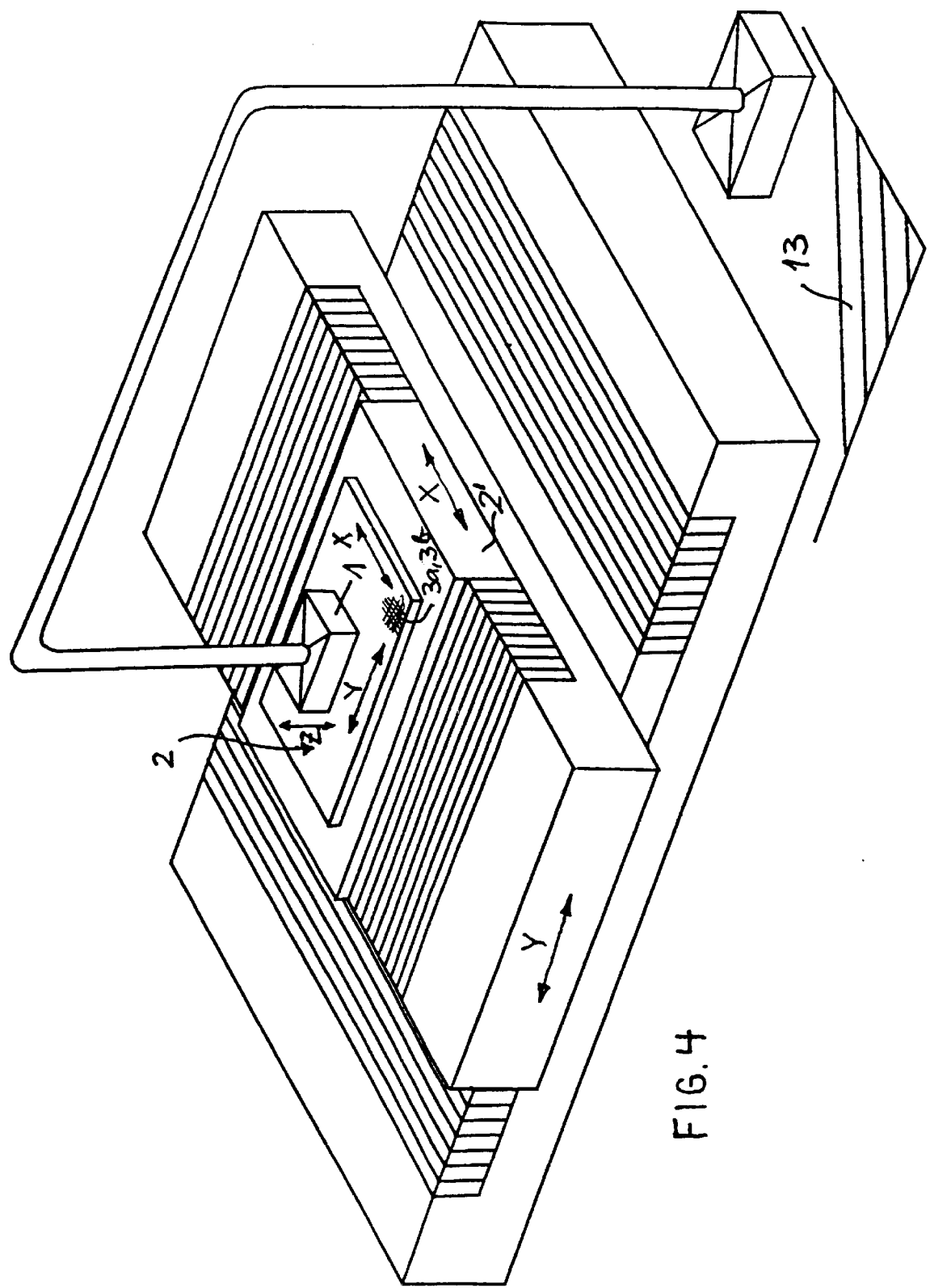
FIG. 4 shows a fourth embodiment of the device according to the present invention.

FIG. 4 shows a further application of the invention used to examine linear guide systems. This device has built-on accessories, which are widespread in the machine tool manufacture, where the areal measurement standard 2 is attached to table 2' which can be moved in two translatory moving directions. Using the measuring instrument, it is possible to detect all translatory and rotatory deviations from the ideal, translatory two-dimensional motion relative to base 13 in arbitrary positions of the two-dimensional travel range.

Figure 5:
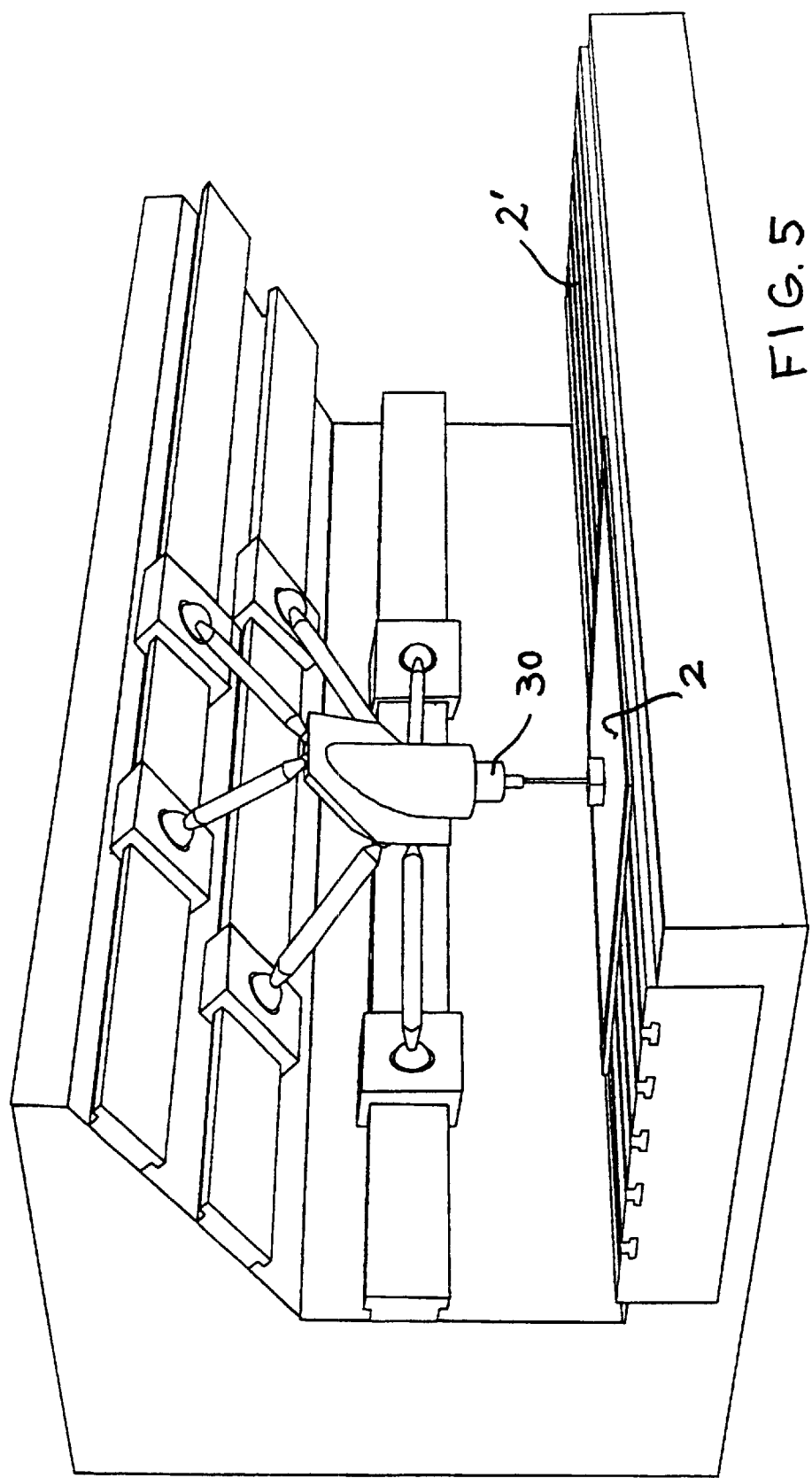
FIG. 5 shows an embodiment of the invention for calibrating a manipulator.

FIG. 5 shows an embodiment used for calibrating a manipulator.

The calibration of manipulators, serial, or parallel moving devices, requires knowledge of the position and orientation of the end-effector relative to a fixed, given reference system. By detecting the hexa-axial position and the position of end-effector 30 in the given reference system, determined by a workpiece clamping surface 2', the determination of correction values for later operation and/or the detection of the effective manipulator geometric properties are made possible. Distributing the measuring points in one plane, defined by the areal measurement standard 2, represents a considerable improvement of the calibration possibilities compared to measuring points which can only be selected in a one-dimensional linear manner, since in the same measurement the measuring points to be approached define a plane.

Figure 6A:
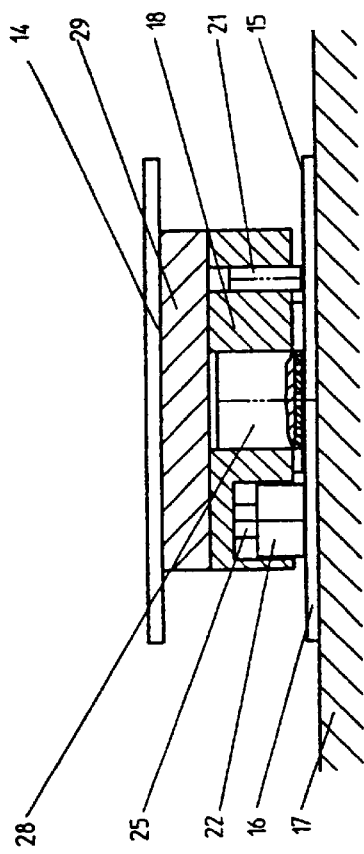
FIGS. 6a and 6b show a top and side view of an embodiment of the device according to the present invention for positioning the body of a waver stepper.
Figure 6B:
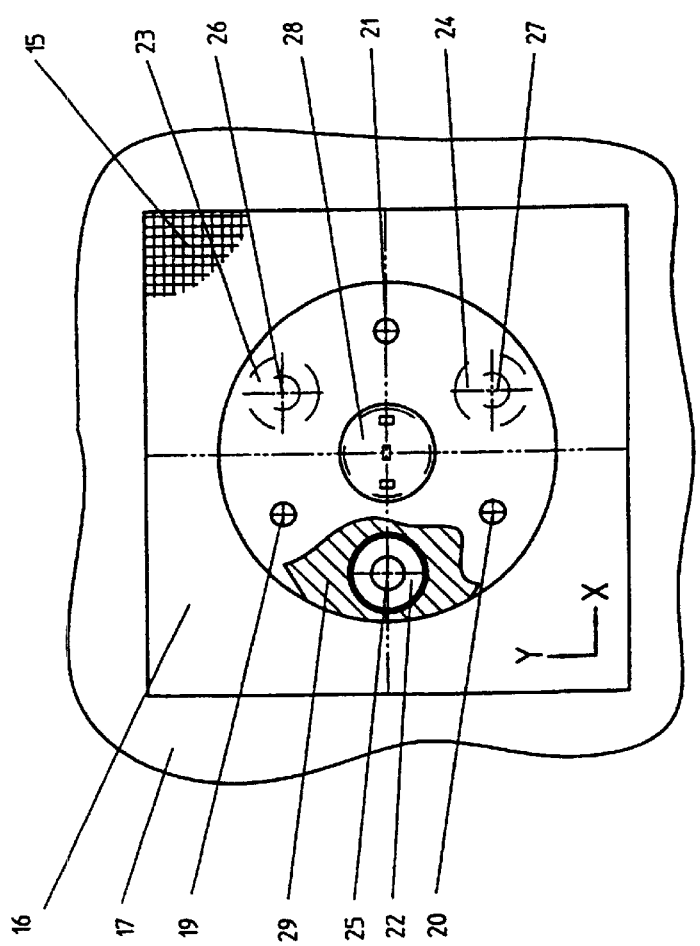

FIGS. 6a and 6b show a device according to the invention for positioning a part 14, for example a wafer, in all degrees of freedom during a two-dimensional translatory basic motion.

The device can be composed, for example, of a plane body 16, which can be made of glass or metal, and which is provided with a two-dimensional optical grating 15, and can be fixed on a massive base plate 17. Located in a component carrier body 18 arranged above, there are distributed symmetrically three distance-measuring devices 19, 20, 21, which are arranged vertically to cross grating 15, and which can be probes or capacitive sensors.

Between distance-measuring devices 19, 20, 21 there are three air bearings 22, 23, 24 resting in a contact-free manner on the lower body 16, having cross grating 15. Instead of air bearings 22, 23, 24, it is possible, for example, to use other bearings which work in a contact-free manner. For example, these can be magnetic bearings. Arranged between air bearings 22, 23, 24 and the component carrier body 18 there are actuators 25, 26, 27, which may be piezoelectric actuators. Using the actuators 25, 26, 27, it is possible to finely change the distance between component carrier body 18 and underlying body 16.

In the middle of component carrier body 18, the scanning head 28 for cross grating 15 is positioned. According to the arrangement in accordance with FIG. 2, scanning head 28, has three gratings of which two are arranged parallel to each other. This scanning head 28 can detect by optical means motion of component carrier body 18 in the X- and Y-axes as well as rotations in the XY-plane relative to cross grating 15.

Additionally, an intermediate plate 29 can be attached to component carrier body 18. Coupled to intermediate plate 29, in a manner not shown, there is an external drive that can include, for example, three linear motors. The drive moves the entire unit supported by air bearings in the X- and Y-axes, and is able to rotate the unit relative to the XY-plane. The top side of intermediate plate 29 is at the same time the fixture surface for the part 14 to be positioned, which, for example, can be suctioned onto intermediate plate 29 using vacuum, thus fixing it in position.

Using the above-described device and an electronic control, for example, a wafer 14 can be positioned in all of its six possible degrees of freedom of motion relative to a plane base area. The relative motions in the X-Y-directions and the rotations in the XY-plane can be produced by the external drives (e.g., linear motors) and detected by central scanning head 28. In addition, the three actuators 25, 26, 27 arranged above the three air bearings 22, 23, 24 can vary the distance of wafer 14 to plane body 16. This relative motion is registered with the assistance of the three distance-measuring devices 19, 20, 21.

Generally, such a device can be used wherever a part, in this case wafer 14, is to be moved in a primarily two-dimensional translatory manner, and in addition is to be adjusted very accurately in all other components of the possible relative motions. This is the case, for example, with a wafer stepper.

What is claimed is:

1. A device for detecting and adjusting a position of two bodies movable relative to each other, comprising:

a plane areal measurement standard disposed on a first of the bodies as a plane reference surface, comprising a two-dimensional grating division;

a plane surface disposed on a second of the bodies, the plane surface being parallel to the measurement standard and having at least two gratings forming a scanning head; and at least one distance measuring device disposed between the first and second bodies.

2. The device according to claim 1, further comprising three distance measuring devices disposed between the first and second bodies, the distance measuring devices being disposed in a non-aligned configuration.

3. The device according to claim 1, wherein three gratings are provided on the second body, two of the three gratings being parallel to each other.

4. The device according to claim 1, wherein the distance measuring devices operate in one of a capacitive mode, inductive mode, mechano-haptical mode, and dynamic pressure mode.

5. The device according to claim 4, wherein the distance-measuring devices are probes that project perpendicularly from one of the first and second bodies.

6. The device according to claim 1, further comprising means for storing and processing signals generated by the scanning head and the at least one distance measuring device during an arbitrary relative motion of the two bodies.

7. The device according to claim 6, further comprising actuators for executing a controlled relative motion of the first and second bodies, wherein the signal storing and processing means controls the actuators.

8. The device according to claim 1, wherein the gratings are optical gratings.

9. A device for positioning a wafer carrier body of a wafer stepper machine, comprising:

a plane areal measurement standard disposed on a base portion of the machine, said measurement standard comprising a plane reference surface and a two-dimensional grating division;

a plane surface disposed on a carrier body, the plane surface being parallel to the measurement standard and having at least two gratings arranged on the plane surface forming a scanning head;

at least one distance measuring device disposed between the base portion and the carrier body;

contact free bearings and actuators provided on the component carrier body; and a controller for receiving position data from the scanning head and the at least one distance measuring device, wherein the orientation of the component carrier body relative to the two-dimensional grating division is adjustable by controlling the bearings and actuators with the controller, in response to the position data.

10. The device according to claim 9, wherein the bearings are air bearings.

11. The device according to claim 9, wherein the actuators are piezoelectric actuators.

* * * * *

UNITED STATES PATENT AND TRADEMARK OFFICE
CERTIFICATE OF CORRECTION

PATENT NO. : 6,351,313 B1
DATED : February 26, 2002
INVENTOR(S) : Braasch et al.

It is certified that error appears in the above-identified patent and that said Letters Patent is hereby corrected as shown below:

<u>Title page,</u>
After Related U.S. Application Data, but before [51], please add -- [30]      Foreign Application Priority Data

Sep. 29, 1997      (CH)…………………………….. 2279/97 --.

Signed and Sealed this

Eighth Day of July, 2003

JAMES E. ROGAN
*Director of the United States Patent and Trademark Office*